(12) United States Patent
Li

(10) Patent No.: US 11,787,907 B2
(45) Date of Patent: Oct. 17, 2023

(54) POLYVINYL THIOETHER ESTER, PREPARATION METHOD THEREFOR AND USE THEREOF

(71) Applicant: SOOCHOW UNIVERSITY, Suzhou (CN)

(72) Inventor: Hongkun Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/676,648

(22) Filed: Feb. 21, 2022

(65) Prior Publication Data

US 2022/0195120 A1   Jun. 23, 2022

Related U.S. Application Data

(63) Continuation of application No. PCT/CN2020/105645, filed on Jul. 29, 2020.

(30) Foreign Application Priority Data

Aug. 22, 2019 (CN) .......................... 201910780521.6

(51) Int. Cl.
*C08G 75/045* (2016.01)
*G01N 21/64* (2006.01)

(52) U.S. Cl.
CPC ... *C08G 75/045* (2013.01); *G01N 2021/6417* (2013.01)

(58) Field of Classification Search
CPC ...... C08G 75/02; C08G 75/045; C08G 75/45; C08G 75/12; C08G 75/04; C08G 18/04;
(Continued)

(56) References Cited

U.S. PATENT DOCUMENTS

2013/0281565 A1   10/2013   Shipp et al.

FOREIGN PATENT DOCUMENTS

CN    102803320 A    11/2012
CN    103467742 A    12/2013
(Continued)

OTHER PUBLICATIONS

Kuroda et al., Macromolecules 1995,28, 6020-6025.*

*Primary Examiner* — Shane Fang
(74) *Attorney, Agent, or Firm* — SZDC LAW P.C.

(57) ABSTRACT

Disclosed are a polyvinyl thioether ester, a preparation method therefor and use thereof. The polyvinyl thioether ester is obtained by subjecting a binary acetylenic acid ester-based internal-alkyne monomer and a dithiol monomer as starting materials to a solution polymerization reaction. The staring materials of the polymerization reaction are easy to obtain, and no by-products are produced during the process of the polymerization reaction. The polymerization reaction has a wide substrate applicability and a good functional group compatibility, such that various functional groups can be conveniently introduced. No catalyst is used in the polymerization reaction, and, the influence of a catalyst residue on the optical and electrical properties and the biological properties of a polymer material can be eliminated. The prepared polyvinyl thioether ester has a good workability, a higher heat stability and aggregation-induced luminescence performance, and has application value in terms of optical plastics, biomedical materials, fluorescent sensing, etc.

7 Claims, 4 Drawing Sheets

(58) Field of Classification Search
CPC ........... G01N 2021/6417; C09J 181/02; C07C 321/18; C07C 323/14; C08L 81/02; C08L 81/00; B05D 3/02; C08F 8/34; B64D 45/02
See application file for complete search history.

(56) References Cited

FOREIGN PATENT DOCUMENTS

| | | | |
|---|---|---|---|
| CN | 108513577 | A | 9/2018 |
| CN | 109438700 | A | 3/2019 |
| CN | 110483773 | A | 11/2019 |
| JP | H0645696 | B2 | 6/1994 |

\* cited by examiner

POLYVINYL THIOETHER ESTER, PREPARATION METHOD THEREFOR AND USE THEREOF

This application is a Continuation Application of PCT/CN2020/105645, filed on Jul. 29, 2020, which claims priority to Chinese Patent Application No. CN 201910780521.6, filed on Aug. 22, 2019, which is incorporated by reference for all purposes as if fully set forth herein.

TECHNICAL FIELD

The invention relates to the technical field of polymer chemistry and materials science, and particularly relates to a polyvinyl thioether ester, preparation method therefor and application thereof.

BACKGROUND TECHNIQUE

The preparation of polymers with new structures based on new polymerization reactions has important research significance and application value. Among them, the use of the polymerization reaction of acetylene monomers to construct functional polymers has become a research hotspot in recent years. The reaction of alkynes with mercaptans was reported as early as the early 19th century, but it did not attract much attention at that time. In 2009, Bowman and others in the United States used ultraviolet light-induced terminal alkynes to react with sulfhydryl groups, that is, one alkynyl group adds two sulfhydryl groups to prepare a cross-linked polysulfide. In 2010, the Tang research group of Hong Kong University of Science and Technology used organic alkali-catalyzed polymerization of active terminal alkynes and mercaptans prepared soluble polyvinyl sulfide. Subsequently, they used rhodium-catalyzed polymerization of terminal alkynes and thiophenol to prepare stereoregularity adjustable Recently, they used potassium phosphate to catalyze this type of polymerization reaction to prepare all-cis polyalkenyl sulfide with anti-Markov addition. The acetylenic monomers used in the above-mentioned polymerization reactions are all terminal acetylenic compounds, and the polymerization reaction based on internal acetylenic and mercapto-based monomers is rarely reported, and the reaction requires the use of a catalyst.

In addition, organic and polymer light-emitting materials with a planar molecular structure usually emit strong light in a dilute solution state, but at a high concentration or aggregation state, the light emission is weakened or even does not emit light. The quenching effect caused by this concentration or aggregation limits the application range of this type of luminescent material. In recent years, aggregation-induced luminescence (AIE) materials have been widely used in display, chemical detection and biosensing fields due to their higher luminous efficiency in the aggregate state than in the solution state (Chem. Rev. 2015, 115: 11718-11940). Compared with small organic molecules, polymer materials often have better processing properties. For example, large-area thin films can be prepared by simple spin coating or pouring methods. Therefore, the development of new-structured AIE polymer materials has important application value.

Technical Problem

The object of the present invention is to provide a polyvinyl thioether ester, a preparation method and application of the polymer, such as the application in the detection of polynitroaromatic hydrocarbons.

Technical Solutions

In order to achieve the above-mentioned object of the invention, the technical solution is adopted by the present invention.

A polyvinyl thioether ester has the following formula I.

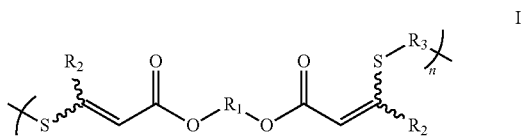

In formula I, n is 2 to 200; $R_1$ is one of Groups 1 to 20, $R_2$ is Group 21 or Group 22, $R_3$ is one of Groups 1 to 8, Group 23, or Group 24.

The invention also discloses the preparation method of the polyvinyl thioether ester, the polyvinyl thioether ester is prepared by a polymerization of an acetylenic acid ester monomer and a dithiol monomer as starting materials.

The invention also discloses a method for detecting nitro aromatic hydrocarbon explosives, which include the following steps.

(1) The polyvinyl thioether ester is prepared by the polymerization of an acetylenic acid ester monomer and a dithiol monomer as starting materials.

(2) Preparing the polyvinyl thioether ester solution and measuring the fluorescence spectrum to get a reference fluorescence spectrum.

(3) Adding the polyvinyl thioether ester into a system and detecting the fluorescence spectrum; comparing the detection fluorescence spectrum with the reference fluorescence spectrum to complete the detection of nitroaromatic hydrocarbon explosives. The invention discloses the application of the above polyvinyl thioether ester in detecting nitroaromatic hydrocarbon explosives.

Preferably, the nitroaromatic hydrocarbon explosive is picric acid (PA); the solvent in the polyvinyl thioether ester solution is a mixture of tetrahydrofuran and water. More preferably, a volume fraction of water in the mixture of tetrahydrofuran and water is 90%; a concentration of the polyvinyl thioether ester solution is in the range from 10 to 5 mol/L; comparing the detection fluorescence spectrum with the reference fluorescence spectrum, if the spectrum does not change, the system to be detected does not contain nitroaromatic hydrocarbon explosives, if the spectrum fluorescence intensity is weakened, the system to be detected contains nitro aromatic hydrocarbon explosives; the polyvinyl thioether ester of the present invention can qualitatively or quantitatively detect nitro aromatic hydrocarbon explosives.

The process of detecting PA in the present invention can be exemplified as follows: first preparing a polyvinyl thioether ester tetrahydrofuran aqueous solution of $10^{-5}$ mol/L (the volume fraction of water is 90%), measuring the fluorescence spectrum, and then sequentially adding different amounts of the detected substance PA, measuring the fluorescence spectrum. The results are: when PA is not added, the fluorescence of the test substance is very strong; when PA is added, the fluorescence is weakened, and as the content of PA increase, the fluorescence decreases respectively. The polyvinyl thioether ester of the present invention can be used as the sensor to detect nitroaromatic hydrocarbon explosives.

In the above technical scheme, the polymerization is conducted under a nitrogen atmosphere without the catalyst; the reaction temperature is in the range from 30 to 120° C., preferably in the range from 60 to 100° C., the reaction time of polymerization is 3 to 36 hours, preferably 12 to 24 hours.

In the above technical scheme, acetylenic acid ester monomer, the dithiol monomer and the solvent are mixed to obtain mixture, then the polyvinyl thioether ester is prepared by the polymerization of mixture; the molar ratio of acetylenic acid ester monomer and the dithiol monomer is 1:1; in the mixed solution, the concentration of monomer is in the range from 0.05 to 1 mol/L, preferably the concentration of monomer is in the range from 0.5 to 1 mol/L; the concentration of monomer is the concentration of acetylenic acid ester monomer or the dithiol monomer.

In the above technical scheme, the solvent can be a conventional high boiling point solvent, such as N,N-dimethylformamide (DMF), N,N-dimethylacetamide (DMAc), dimethyl sulfoxide (DMSO), and toluene.

In the above technical scheme, the polymer solution is obtained after the polymerization, and the polyvinyl thioether ester is obtained by post-treatment; preferably, the post-treatment is that the polymer solution is diluted with chloroform and dropped it into n-hexane to precipitate to obtain the polyvinyl thioether ester.

In the invention, the acetylenic acid ester monomer is prepared by the esterification of acetylenic acid and diol compound; preferably, the esterification is carried out in dimethyl sulfoxide, dichloromethane, N,N'-bicyclichexylcarbimide, 4-dimethylaminopyridine and p-toluenesulfonic acid monohydrate. The polymerization is carried out at room temperature for 12 to 36 hours.

In the invention, the structural formula of the diol compound is:

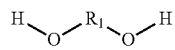

The structural formula of the acetylenic acid is:

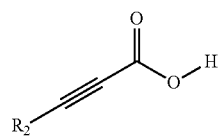

The structural formula of the acetylenic acid ester monomer is:

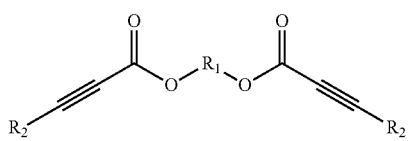

Wherein, $R_1$ is one of Groups 1 to 20, $R_2$ is Group 21 or Group 22.

The structural formula of the dithiol monomer is:

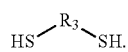

Wherein $R_3$ is one of Groups 1 to 8, Group23 and Group24.

In the invention, the structures of Groups 1 to 24 are:

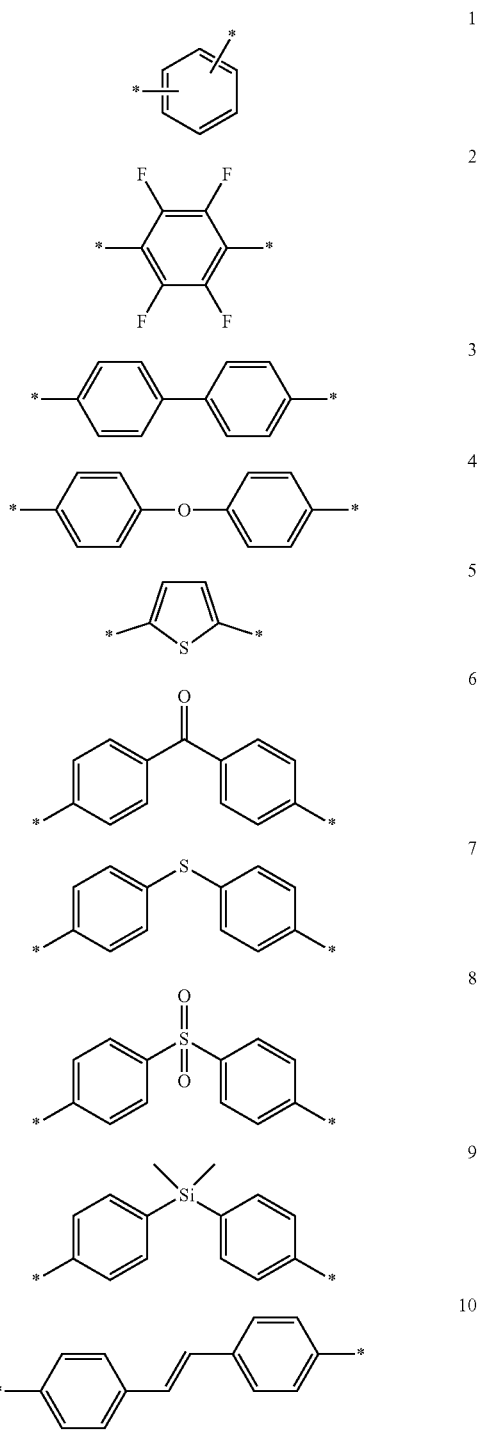

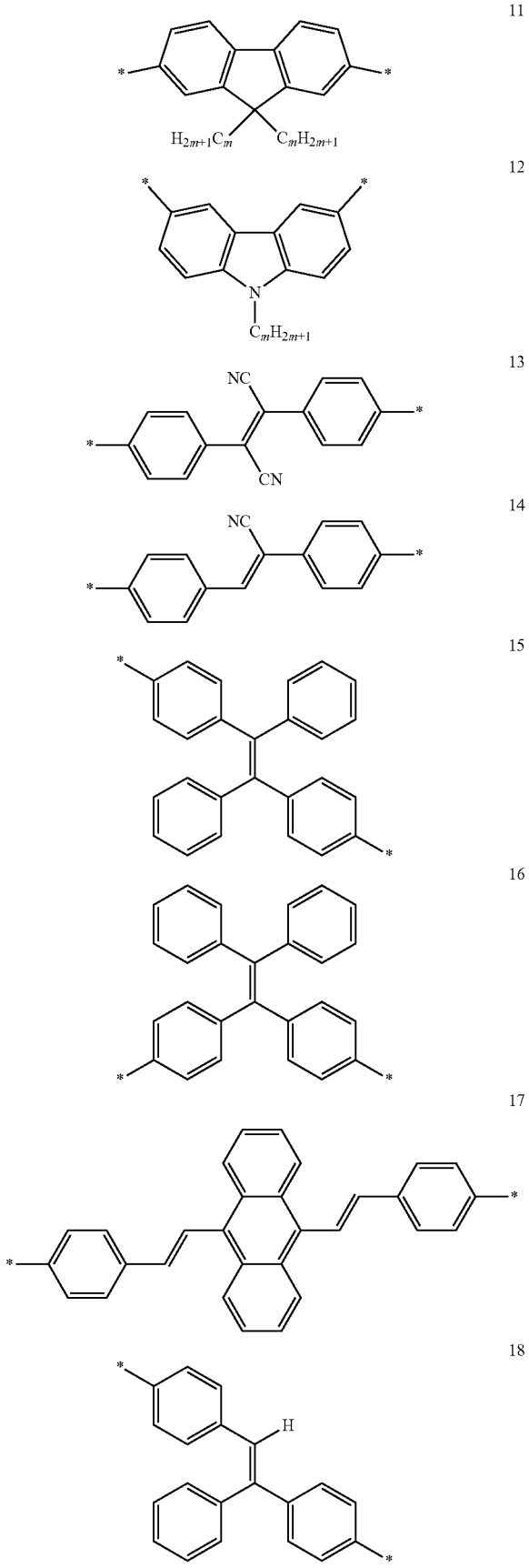

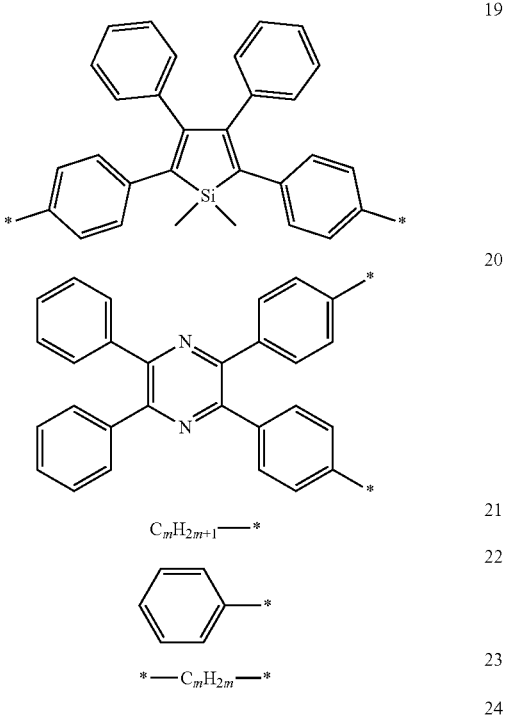

Wherein m is 1 to 18, and * is the position of substitution.

The preparation method of polyvinyl thioether ester of the present invention can be as follows, using 2-alkyl acetylenic acid or phenylpropynic acid and diol compound as starting materials, acetylenic acid ester monomer is prepared by esterification. The preparation process is: mixing dichloromethane (DCM), the diol compound, N,N-dicyclohexylcarbimide (DCC), 4-(dimethyl-amino)pyridine (DMAP), p-toluenesulfonic acid monohydrate; then adding dichloromethane solution of acetylenic acid dropwise at 0° C.; add dropwise After completing the reaction at room temperature for 12 to 36 hours, the acetylenic acid ester monomer is obtained. The prepared acetylenic acid ester monomer and dithiol monomer are dissolved in the solvent to conduct a polymerization to obtain the polyvinyl thioether ester. The specific steps are: a reaction tube is filled with a molar ratio of acetylenic acid ester monomer and the dithiol monomer of 1:1. The reaction tube is vacuumed and filled with dry nitrogen three times through the side arm three times. The concentration of either monomer in mixture is in the range from 0.05 to 1 mol/L with dissolving solution, preferably, in the range from 0.5 to 1 mol/L. At the beginning of polymerization, the temperature is at from 30 to 120° C., preferably, the temperature is in the range from 60 to 100° C. The reaction time is for 3 to 36 hours, preferably, is for 12 to 24 hours. After the reaction is complete, the polymer solution is subjected to post-treatment to obtain the polyvinyl thioether ester. The post-treatment is that the polymer solution is diluted with chloroform, then dropped into n-hexane, and precipitated to obtain the polyvinyl thioether ester. The solvent can be a conventional high-boiling solvent, such as N, N-dimethylformamide (DMF), N,N-dimethylacetamide (DMAc), dimethyl sulfoxide (DMSO), and toluene.

The polyvinyl thioether ester containing polyarylate and sulfur elements prepared by the present invention is expected to be used as a high refractive index optical plastic;

polyvinyl thioether ester with AIE performance can be used as a fluorescence sensor, such as detecting polynitroaromatic hydrocarbons, that is important application in preventing explosive attacks. Therefore, the present invention also discloses the application of the above-mentioned polyvinyl thioether ester in the preparation of high refractive index optical plastics, luminescent patterns, and fluorescent sensors; at the same time, the present invention further discloses that the above-mentioned polyvinyl thioether ester is used in the detection of polynitroaromatic hydrocarbons.

The general formula for the above reaction is:

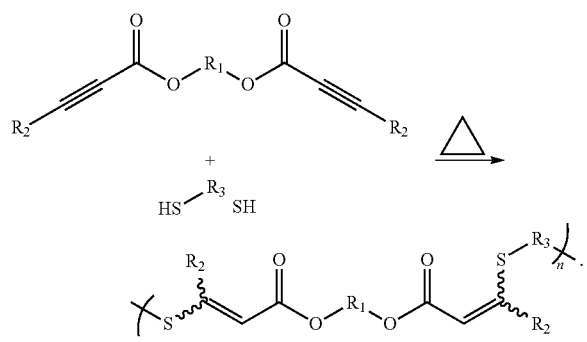

The polyvinyl thioether ester prepared by the invention has good solubility and is soluble in common organic solvents at room temperature, such as dichloromethane, chloroform, tetrahydrofuran, N, N-dimethylformamide and dimethyl sulfoxide etc. At the same time, it has high thermal stability, and can introduce functional groups to make it have special properties, such as AIE properties.

Beneficial Effect

In the method for preparing polyvinyl thioether ester by using catalyst-free polymerization reaction of the present invention, reaction starting materials are commercially available, and can be directly purchased or synthesized through simple reaction; no by-products are generated during the polymerization, which conforms to atomic economy. The reaction has a wide range of substrate applicability and good functional group compatibility, and can easily introduce a variety of functional groups; the polymerization does not use a catalyst, which can eliminate the influence of catalyst residue on the biological and photoelectric proper-ties of the polymer material. Therefore, the polymerization has important scientific significance and application value in polymer synthesis and polymer functional materials.

DETAILED DESCRIPTION

Figure 1:
FIG. 1 is a solution diagram of the polyvinyl thioether ester, and the numbers indicate the concentration.

Hereinafter, the present invention will be described in detail in conjunction with examples, but the protection scope of the present invention is not limited to the following examples. FIG. 1 is a general structural diagram of polyvinyl thioether ester in the present invention.

Example 1

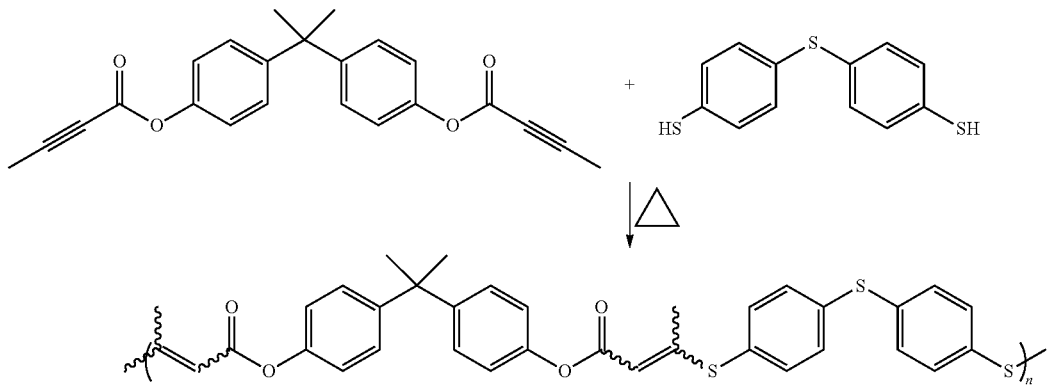

Synthesis of the First Monomer: Butynoate Acid Ester Monomer

Into a 250 mL two-necked flask were added 2.3 g (10 mmol) of bisphenol A, 6.2 g (30 mmol) of N,N-dicyclohex-ylcarbimide (DCC), 0.5 g (4 mmol) of 4-(dimethylamino) pyridine (DMAP), and 0.8 g (4 mmol) of p-toluenesulfonic acid monohydrate (TsOH). The flask was evacuated and refilled with dry nitrogen three times. Freshly distilled DCM (80 mL) was injected, and the solution was cooled to 0° C. with an ice-water bath. Then 2.0 g (25 mmol) of 2-butynoic acid dissolved in 20 mL of dry DCM was added and drop it into the above reaction system with a constant pressure dropping funnel. The reaction mixture was stirred overnight, washed with DCM, and to obtain the crude product by rotary evaporation of the filtrate. The crude product was separated and purified by column chromatography and dried to a constant weight in vacuum, the first monomer:butynoate monomer was obtained in 72% yield (2.6 g) as a white solid. $^1$H NMR (400 MHz, CDCl$_3$) δ 7.24 (t, J=9.6 Hz, 4H), 7.04 (t, J=11.3 Hz, 4H), 2.05 (s, 6H), 1.64 (d, J=10.3 Hz, 6H).

The second monomer: 4-4'thiobisbenzenethiol was commercially available.

Into a 10 mL Schlenk tube with a stopcock in the side arm was placed 36.0 mg (0.1 mmol) of the first monomer: the butynoate monomer and 25.0 mg (0.1 mmol) of the second monomer: 4-4'thiobisbenzenethiol. The tube was evacuated and refilled with dry nitrogen three times through the side arm, and 0.2 mL of dry DMF was injected to dissolve the monomers. The solution was stirred at 60° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the target polymer was obtained. The prepared target polymer polyvinyl thioether ester is easily soluble in dichloromethane, 1,2-dichloroethane, chloroform, tetrahydrofuran, N,N-dimethylformamide and dimethyl sulfoxide at room temperature. Common organic solvents have good processability and film-forming properties. When the concentration is 25 mg/mL, the polyvinyl thioether ester tetrahydrofuran solution is clear.

Characterization data: 76% yield of the white solid. The result of GPC, $M_w$ is 44100, PDI is 2.3. $^1$H NMR (400 MHz, CDCl$_3$) δ7.65-7.25, 7.25-7.00, 6.88, 6.08, 5.51-5.28, 3.42-2.73, 2.98, 3.24-2.73, 2.07, 2.81-0.98, 2.28-0.98, 2.03-1.06, 1.86-1.06, 1.86-1.06, 1.42-1.06, 1.42-1.06.

Figure 2:
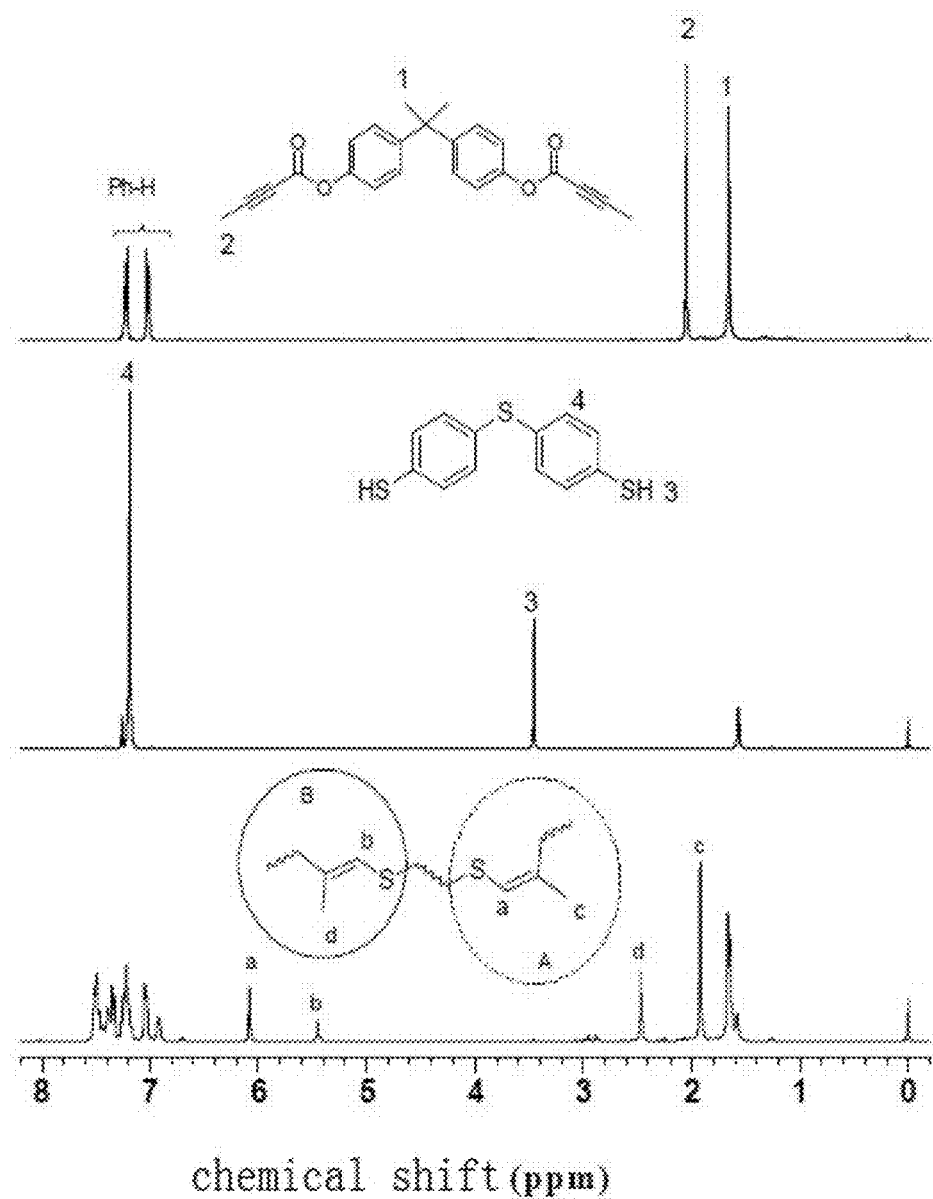
FIG. 2 is a hydrogen nuclear magnetic spectrum of the polyvinyl thioether ester and its corresponding monomers in $CDCl_3$ prepared in Example 1.
Figure 3:
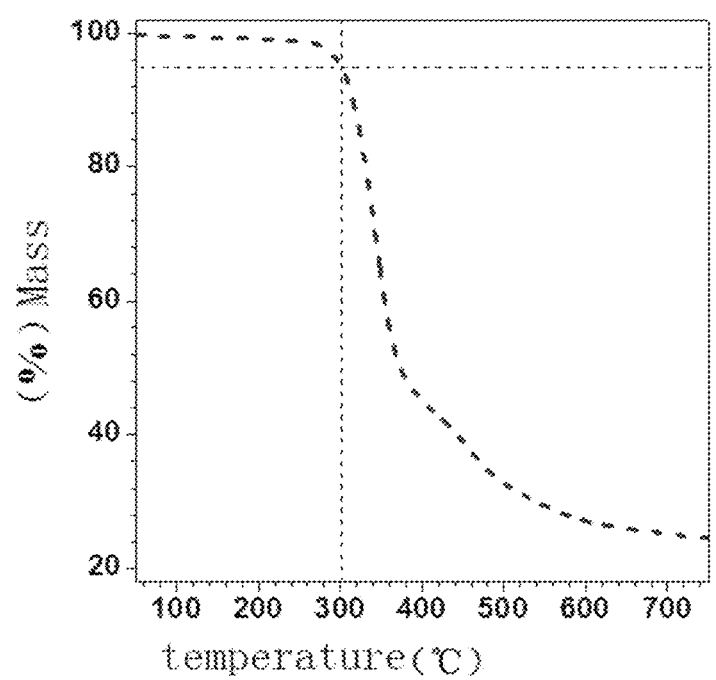
FIG. 3 is a graph of the thermal weight loss curve of the polyvinyl thioether ester prepared in Example 1, and the test condition is: under a nitrogen atmosphere, the heating rate is 10° C./min.

The comparison of the hydrogen nuclear magnetic resonance spectrum of the polymer and its corresponding monomer is shown in FIG. 2. From the figure, it can be determined that the polymer is the polyvinyl thioether ester. Among them, there is a resonance absorption peak at δ 3.45, the peak disappeared in the polymer, and two new peaks appeared at δ6.08 (a), 5.46(b), which proved that the polymerization reaction took place and there were two isomers A and B. According to the integral area of a and b in the polymer spectrum, the content of isomers A and B in the polymer are calculated to be 72% and 28%, respectively. Indicating that the polymerization reaction. The temperatures of 5% weight loss ($T_d$) of polyvinyl thioether ester is at 300° C. (see FIG. 3), indicating there is a high thermal stability.

Example 2

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 2 mL of dry DMF was injected to dissolve the monomers. The solution was stirred at 60° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 82% yield. The result of GPC, $M_w$=13800, PDI=2.2. There is also a good solubility and thermal stability of the polymer. The temperature of 5% weight loss ($T_d$) is at 298° C.

Example 3

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 1 mL of dry DMF was injected to dissolve the monomers. The solution was stirred at 60° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 77% yield. The result of GPC, $M_w$=18600, PDI=2.3. There is also a good solubility and thermal stability of the polymer.

Example 4

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.5 mL of dry DMF was injected to dissolve the monomers. The solution was stirred at 60° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 82% yield. The result of GPC, $M_w$=24700, PDI=2.4. There is also a good solubility and thermal stability of the polymer. With other conditions unchanged, if the reaction solvent (dry DMF) is changed to chloroform or dry DCE, there would not polymer have obtained.

Example 5

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.1 mL of dry DMF was injected to dissolve the monomers. The solution was stirred at 60° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 74% yield. The result of GPC, $M_w$=27700, PDI=2.1. There is also a good solubility and thermal stability of the polymer.

Example 6

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.5 mL of dry DMF was injected to dissolve the monomers. The solution was stirred at 30° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 76% yield. The result of GPC, $M_w$=11500, PDI=1.5. There is also a good solubility and thermal stability of the polymer. With other conditions unchanged, if the reaction solvent (dry DMF) is changed to dry THF, there would not polymer have obtained.

Example 7

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.5 mL of dry DMF was injected to dissolve the monomers. The solution was stirred at 80° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 53% yield. The result of GPC, $M_w$=37700, PDI=2.4. There is also a good solubility and thermal stability of the polymer. With other conditions unchanged, if the reaction time is changed to 1 h, there would not polymer have obtained.

Example 8

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.5 mL of dry DMF was injected to dissolve the monomers. The solution was stirred at 100° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 76% yield. The result of GPC, $M_w$=33800, PDI=2.5. There is also a good solubility and thermal stability of the polymer.

Example 9

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.5 mL of dry DMF was injected to dissolve the monomers. The solution was stirred at 120° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 82% yield. The result of GPC, $M_w$=19600, PDI=2.0. There is also a good solubility and thermal stability of the polymer.

Example 10

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.5 mL of dry DMF was injected to dissolve the monomers. The solution was stirred at 60° C. for 3 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 66% yield. The result of GPC, $M_w$=6400, PDI=1.7. There is also a good solubility and thermal stability of the polymer.

Example 11

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.5 mL of dry DMF was injected to dissolve the monomers. The solution was stirred at 60° C. for 6 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 80% yield. The result of GPC, $M_w$=10000, PDI=1.9. There is also a good solubility and thermal stability of the polymer.

Example 12

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.5 mL of dry DMF was injected to dissolve the monomers. The solution was stirred at 60° C. for 12 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 75% yield. The result of GPC, $M_w$=24200, PDI=1.9. There is also a good solubility and thermal stability of the polymer.

Example 13

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.5 mL of dry DMF was injected to dissolve the monomers. The solution was stirred at 60° C. for 36 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 74% yield. The result of GPC, $M_w$=56000, PDI=2.5. There is also a good solubility and thermal stability of the polymer.

Example 14

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.5 mL of dry DMSO was injected to dissolve the monomers. The solution was stirred at 120° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 72% yield. The result of GPC, $M_w$=12600, PDI=2.0. There is also a good solubility and thermal stability of the polymer.

Example 15

The butynoate monomer and the 4-4'thiobisbenzenethiol are the same as in Example 1. Into a 10 mL Schlenk tube with a stopcock in the side arm was placed 36.0 mg (0.1 mmol) of the first monomer and 25.0 mg (0.1 mmol) of the second monomer. The tube was evacuated and refilled with dry nitrogen three times through the side arm, and 0.5 mL of dry toluene was injected to dissolve the monomers. The solution was stirred at 100° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 75% yield. The result of GPC, $M_w$=12600, PDI=2.0. There is also a good solubility and thermal stability of the polymer.

Example 16

Synthesis of the First Monomer: The Butynoate

Into a 250 mL two-necked flask were added 4 g (20 mmol) of 4-hydroxybenzophenone, 5.2 g (80 mmol) of zinc powder. The flask was evacuated and refilled with dry nitrogen three times. Dry tetrahydrofuran was injected and stirred to dissolve, the solution added 7.6 g (40 mmol) of titanium tetrachloride at 0° C. After the reaction keep it at 0° C. for half an hour to room temperature, and then reacted with heating and stirring at 75° C. overnight. After the reaction, the reaction was quenched with a potassium carbonate solution with a mass fraction of 20%, and dilute hydrochloric acid was added until no bubbles were generated. Extracted with dichloromethane and dried with anhydrous magnesium sulfate, filtered, and the filtrate was removed by rotary evaporation. Into a 250 mL two-necked flask were added all the residue, 6.2 g (30 mmol) of DCC, 0.5 g (4 mmol) of DMAP, 0.8 g (4 mmol) of TsOH. The flask was evacuated and refilled with dry nitrogen three times. Then the solution added 80 ml dry DCM to dissolve. Then 2.0 g (25 mmol) of 2-butynoic acid dissolved in 20 mL of dry DCM was added and drop it into the above reaction system with a constant pressure dropping funnel. The reaction mixture was stirred overnight, washed with DCM, and to obtain the crude product by rotary evaporation of the filtrate. The crude product was separated and purified by column chromatography and dried to a constant weight in vacuum, the first monomer:butynoate monomer was obtained in 50% yield (2.8 g) as a white solid. $^1$H NMR (400 MHz, CDCl$_3$): δ7.19-6.79 (m, 18H), 2.04 (s, 6H).

The second monomer: 4-4'thiobisbenzenethiol was the same as in Example 1.

Into a 10 mL Schlenk tube with a stopcock in the side arm was placed 49.6 mg (0.1 mmol) of the first monomer and

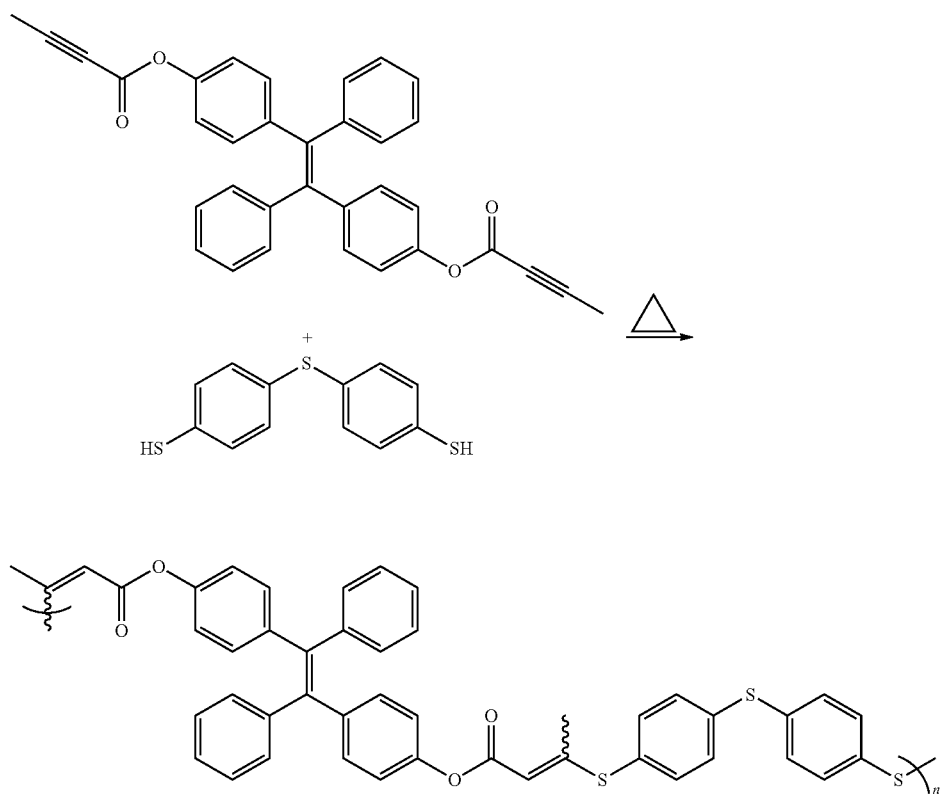

25.0 mg (0.1 mmol) of the second monomer. The tube was evacuated and refilled with dry nitrogen three times through the side arm, and 0.2 mL of dry DMF was injected to dissolve the monomers. The solution was stirred at 60° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 89% yield. The result of GPC, $M_w$=18200, PDI=1.9. There is also a good solubility and thermal stability of the polymer. The photo of polyvinyl thioether ester tetrahydrofuran solution (25 mg/mL) as FIG. 1. The polymer also has aggregation-induced luminescence properties and can be used for the detection of explosives.

Figure 4:
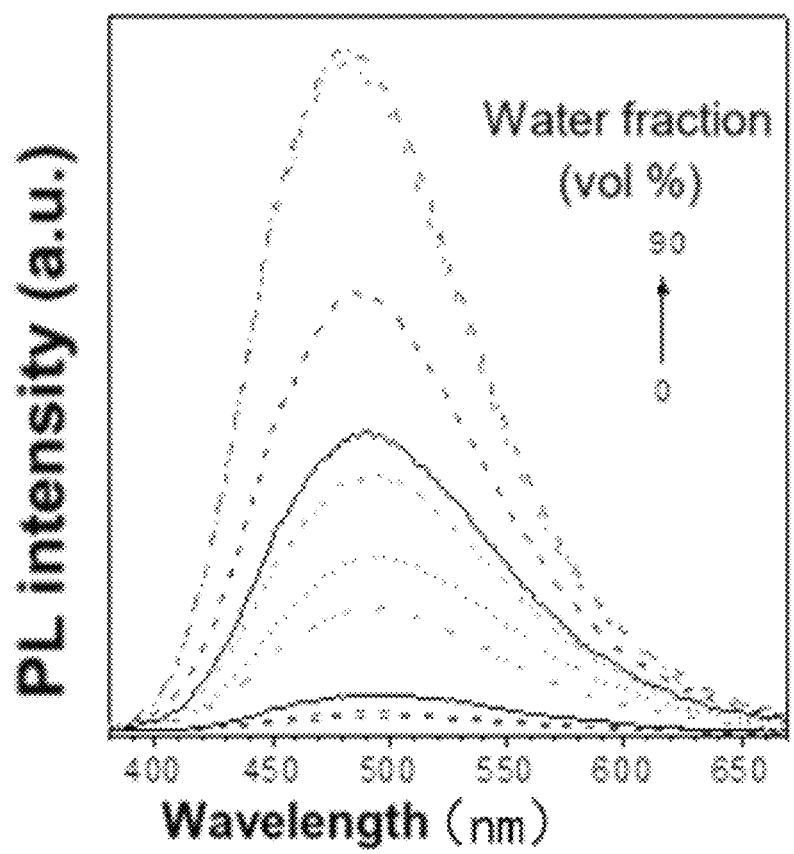
FIG. 4 shows the fluorescence spectra of the polyvinyl thioether ester prepared in Example 16 in the solution state and the aggregate state.

The polymer has extremely weak luminescence in tetrahydrofuran solution, and the fluorescence is significantly enhanced after the addition of poor solvent (water), indicating that it has aggregation-induced luminescence properties, see FIG. 4.

Figure 5:
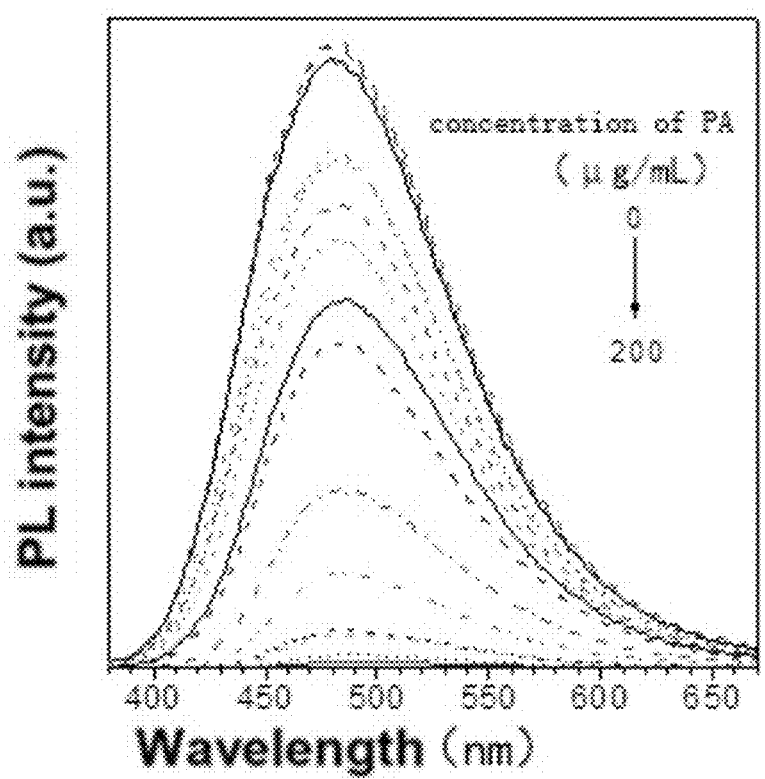
FIG. 5 is a fluorescence spectrogram of the polyvinyl thioether ester prepared in Example 16 for detecting picric acid in an aggregated state.

Application of polyvinyl thioether ester in the detection of nitroaromatic hydrocarbon explosives: picric acid (PA) is used as a model explosive, the process of detecting PA: first prepare a polyvinyl thioether ester tetrahydrofuran aqueous solution of $10^{-5}$ mol/L (the volume fraction of water is 90%), test the fluorescence spectrum, and then sequentially added in the range from 0 to 200 mg/mL (concentration gradient of 10 mg/mL) of the detected substance PA, test the fluorescence spectrum quickly. The results found that: when PA is not added, the fluorescence of the test substance is very strong; when PA is added, the fluorescence is weakened, and as the content of PA increase, the fluorescence decreases respectively, see FIG. 5. The polyvinyl thioether ester of the present invention can be used as the sensor to detect nitroaromatic hydrocarbon explosives; and further experiments have found that the polymer can detect 0.5 mg/mL of PA with excellent sensitivity.

Adjusted the amount of the above-mentioned first monomer and second monomer to 0.01 mmol, and the rest remain unchanged. The polymer yield was 63%. The polymer has a low molecular weight and also has aggregation-induced luminescence properties, which can be used for the detection of explosives. With the above detection method, the polymer can detect PA of 2.5 mg/mL at least.

Example 17

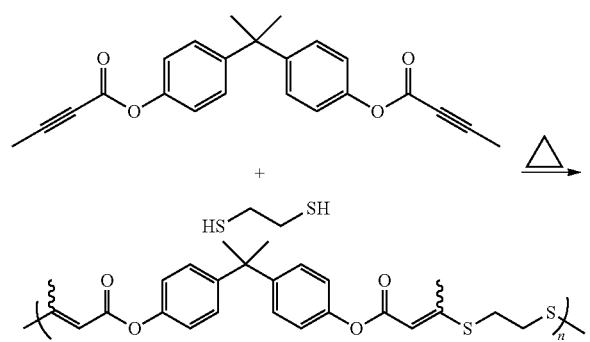

The synthesis of the first monomer:butynoate was the same as in Example 1.

The second monomer: 1,2-ethanedithiol was commercially available.

Into a 10 mL Schlenk tube with a stopcock in the side arm was placed 36.0 mg (0.1 mmol) of the first monomer and 9.4 mg (0.1 mmol) of the second monomer. The tube was evacuated and refilled with dry nitrogen three times through the side arm, and 2 mL of dry DMF was injected to dissolve the monomers. The solution was stirred at 60° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 71% yield. The result of GPC, $M_w$=4900, PDI=1.6. There is also a good solubility and thermal stability of the polymer.

Example 18

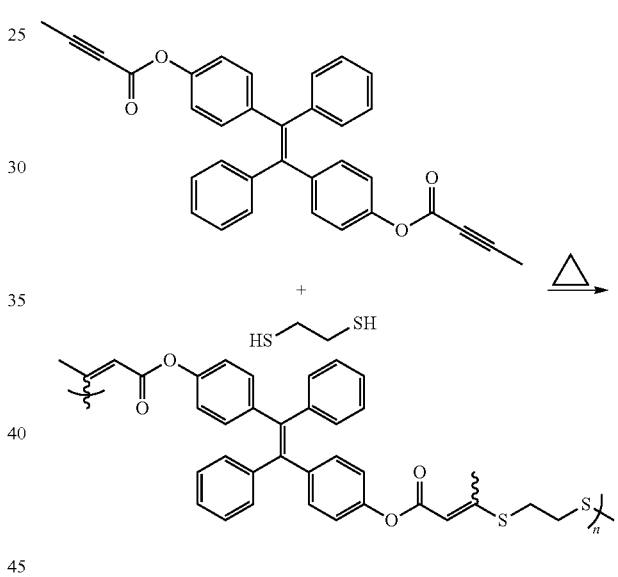

The synthesis of the first monomer:butynoate was the same as in Example 16.

The second monomer: 1,2-ethanedithiol was commercially available.

Into a 10 mL Schlenk tube with a stopcock in the side arm was placed 49.6 mg (0.1 mmol) of the first monomer and 9.4 mg (0.1 mmol) of the second monomer. The tube was evacuated and refilled with dry nitrogen three times through the side arm, and 2 mL of dry DMF was injected to dissolve the monomers. The solution was stirred at 60° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 58% yield. The result of GPC, $M_w$=4700, PDI=1.3. There is also a good solubility and thermal stability of the polymer. There are unique aggregation-induced luminescence properties, and can be used for the detection of explosives.

Example 19

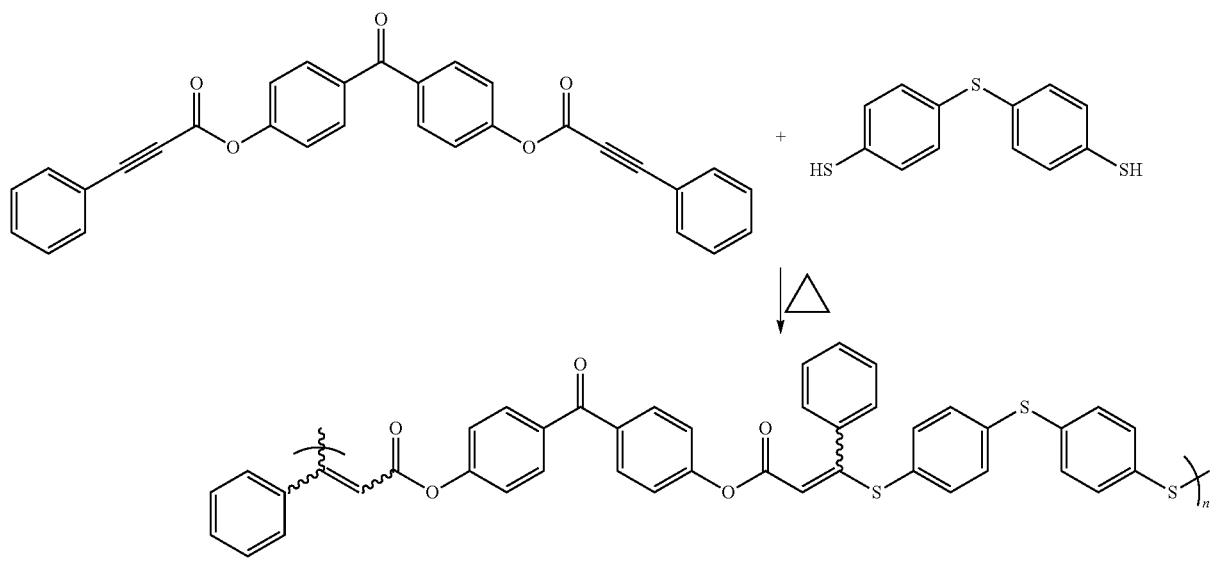

Into a 250 mL two-necked flask were added 2.1 g (10 mmol) of 4,4'-dihydroxybenzophenone, 6.2 g (30 mmol) of DCC, 0.5 g (4 mmol) of DMAP, 0.8 g (4 mmol) of TsOH. The flask was evacuated and refilled with dry nitrogen three times. Then the solution added 80 ml dry DCM to dissolve. Then 3.7 g (25 mmol) of phenylpropynic acid dissolved in 20 mL of dry DCM was added and drop it into the above reaction system with a constant pressure dropping funnel. The reaction mixture was stirred overnight, washed with DCM, and to obtain the crude product by rotary evaporation of the filtrate. The crude product was separated and purified by column chromatography and dried to a constant weight in vacuum, the first monomer:butynoate monomer was obtained in 78% yield (3.8 g) as a white solid. $^1$H NMR (400 MHz, CDCl$_3$) δ 8.04-7.27 (m, 18H).

The second monomer:binary thiophenol monomer was commercially available.

Into a 10 mL Schlenk tube with a stopcock in the side arm was placed 47.0 mg (0.1 mmol) of the first monomer and 25.0 mg (0.1 mmol) of the second monomer. The tube was evacuated and refilled with dry nitrogen three times through the side arm, and 0.2 mL of dry DMF was injected to dissolve the monomers. The solution was stirred at 60° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 91% yield. The result of GPC, $M_w$=15700, PDI=1.7. There is also a good solubility and thermal stability of the polymer.

Example 20

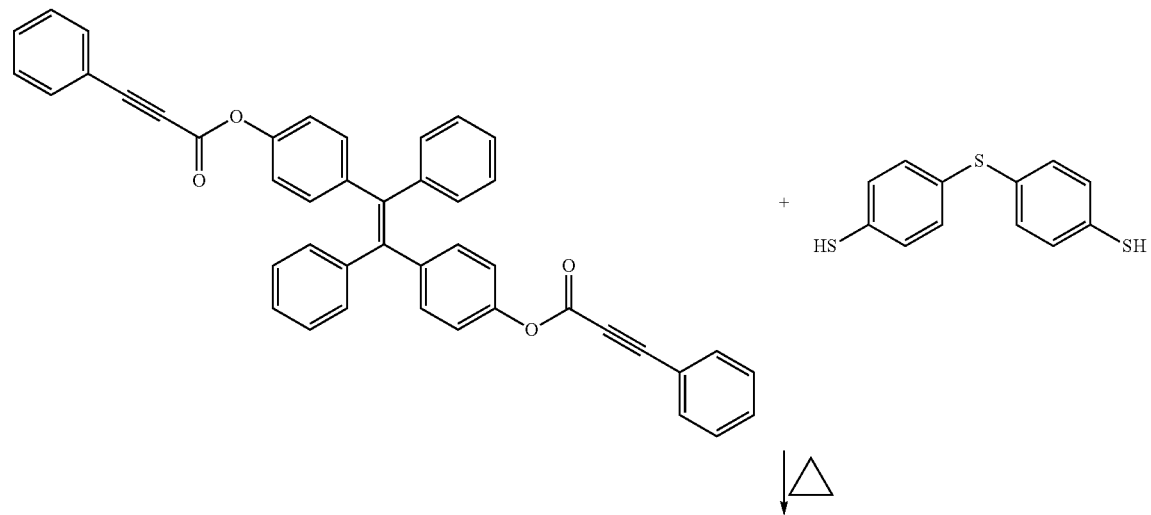

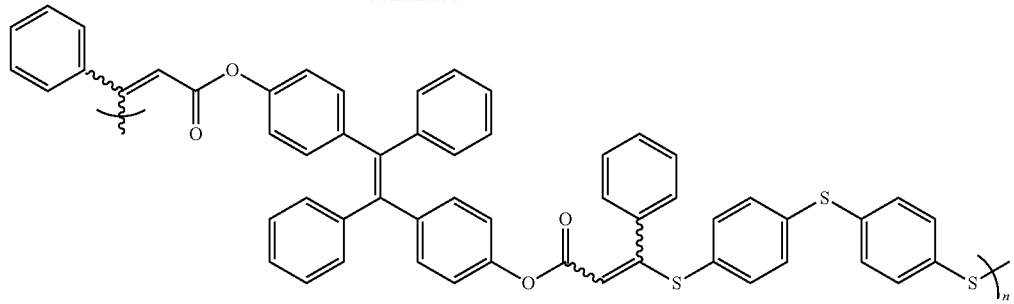

Synthesis of the First Monomer: The Phenylpropargyl Ester

Into a 250 mL two-necked flask were added 4 g (20 mmol) of 4-hydroxybenzophenone, 5.2 g (80 mmol) of zinc powder. The flask was evacuated and refilled with dry nitrogen three times. Dry tetrahydrofuran was injected and stirred to dissolve, the solution added 7.6 g (40 mmol) of titanium tetrachloride at 0° C. After the reaction keep it at 0° C. for half an hour to room temperature, and then reacted with heating and stirring at 75° C. overnight. After the reaction, the reaction was quenched with a potassium carbonate solution with a mass fraction of 20%, and dilute hydrochloric acid was added until no bubbles were generated. Extracted with dichloromethane and dried with anhydrous magnesium sulfate, filtered, and the filtrate was removed by rotary evaporation. Into a 250 mL two-necked flask were added all the residue, 6.2 g (30 mmol) of DCC, 0.5 g (4 mmol) of DMAP, 0.8 g (4 mmol) of TsOH. The flask was evacuated and refilled with dry nitrogen three times. Then the solution added 80 ml dry DCM to dissolve. Then 3.7 g (25 mmol) of phenylpropynic acid dissolved in 20 mL of dry DCM was added and drop it into the above reaction system with a constant pressure dropping funnel. The reaction mixture was stirred overnight, washed with DCM, and to obtain the crude product by rotary evaporation of the filtrate. The crude product was separated and purified by column chromatography and dried to a constant weight in vacuum, the first monomer:phenylpropargyl ester was obtained in 25% yield (1.5 g) as a white solid. $^1$H NMR (400 MHz, CDCl$_3$): δ 7.62 (d, J=7.0 Hz, 4H), 7.53-7.44 (m, 2H), 7.41 (t, J=7.4 Hz, 4H), 7.19-6.89 (m, 18H).

The second monomer: 4-4'-thiobisbenzenethiol was commercially available.

Into a 10 mL Schlenk tube with a stopcock in the side arm was placed 62.0 mg (0.1 mmol) of the first monomer and 25.0 mg (0.1 mmol) of the second monomer. The tube was evacuated and refilled with dry nitrogen three times through the side arm, and 0.2 mL of dry DMF was injected to dissolve the monomers. The solution was stirred at 60° C. for 24 h. After cooling to room temperature, the reaction mixture was diluted with 5 mL of chloroform and added dropwise into 250 mL of n-hexane under strong stirring through a cotton filter. After standing, filter and dried to a constant weight, the polymer was obtained in 85% yield. The result of GPC, $M_w$=26800, PDI=2.1. There is also a good solubility and thermal stability of the polymer, and unique aggregation-induced luminescence properties, and can be used for the detection of explosives.

The invention claimed is:

1. A method of preparing the polyvinyl thioether ester, comprising: using an acetylenic acid ester monomer and a dithiol monomer as starting materials, and conducting a solution polymerization reaction to obtain the polyvinyl thioether ester, wherein the acetylenic acid ester monomer is:

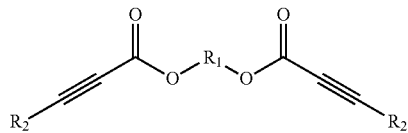

$R_1$ is one of Groups 6 and 15-16, and $R_2$ is Group 21 or Group 22;

wherein the dithiol monomer is:

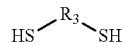

wherein $R_3$ is one of Groups 1 to 8, Group 23, or Group 24,

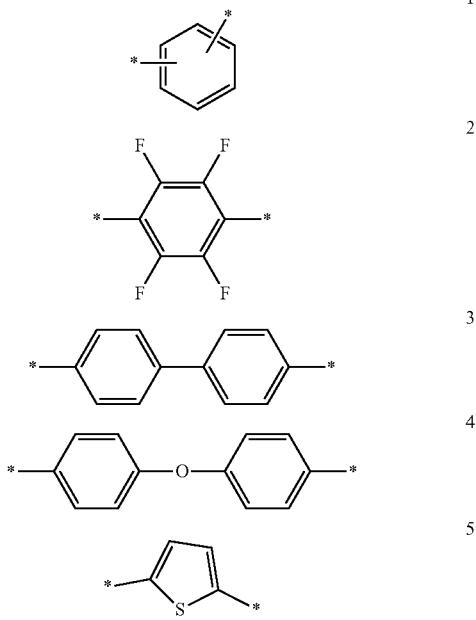

-continued

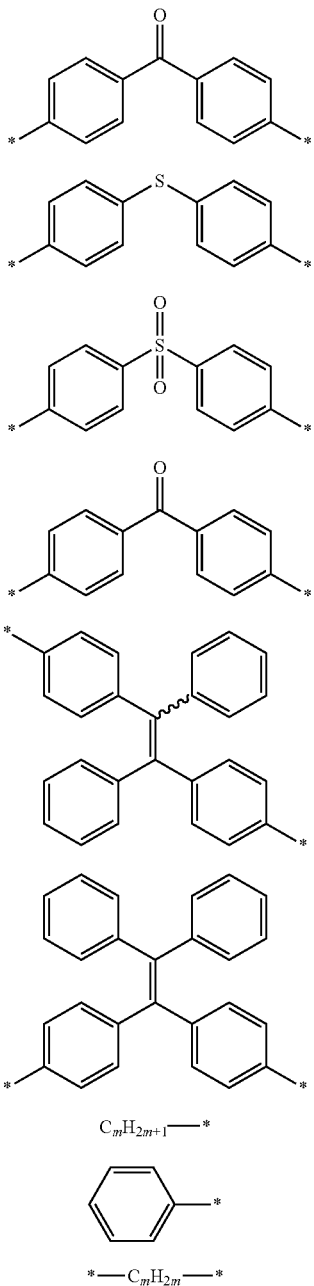

-continued

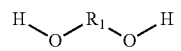

m is 1 to 18.

2. The method of claim 1, wherein the solution polymerization reaction is conducted under a nitrogen atmosphere without a catalyst; a reaction temperature is from 30 to 120° C., and a reaction time is 3 to 36 hours.

3. The method of claim 2, wherein the reaction temperature is from 60 to 100° C., and the reaction time is for 12 to 24 hours.

4. The method of claim 1, further comprising: mixing the acetylenic acid ester monomer, the dithiol monomer, and a solvent to obtain a mixture; and subjecting the mixture to the solution polymerization to obtain the polyvinyl thioether ester, wherein a molar ratio of acetylenic acid ester monomer and the dithiol monomer is 1:1; and a concentration of either monomer in the mixture is from 0.05 to 1 mol/L.

5. The method of claim 4, wherein the concentration of either monomer is from 0.5 to 1 mol/L; the solvent is N,N-dimethylformamide (DMF), N,N-dimethylacetamide, dimethyl sulfoxide, hexamethylphosphoramide, or toluene.

6. The method of claim 1, wherein the acetylenic acid ester monomer is prepared by an esterification reaction of an acetylenic acid and a diol compound;
the diol compound is:

$$H\diagdown_O\diagup^{R_1}\diagdown_O\diagup H$$

the acetylenic acid is:

$$R_2-{\equiv}-C(=O)-O-H$$

wherein $R_1$ is one of Groups 6 and 15-16, and $R_2$ is Group 21 or Group 22.

7. The method of claim 6, wherein the esterification reaction is conducted at room temperature for 12 to 36 hours in dichloromethane and in the presence of N,N'-bicyclichexylcarbimide, 4-dimethylaminopyridine, and P-toluenesulfonic acid monohydrate.

* * * * *